UNITED STATES PATENT OFFICE.

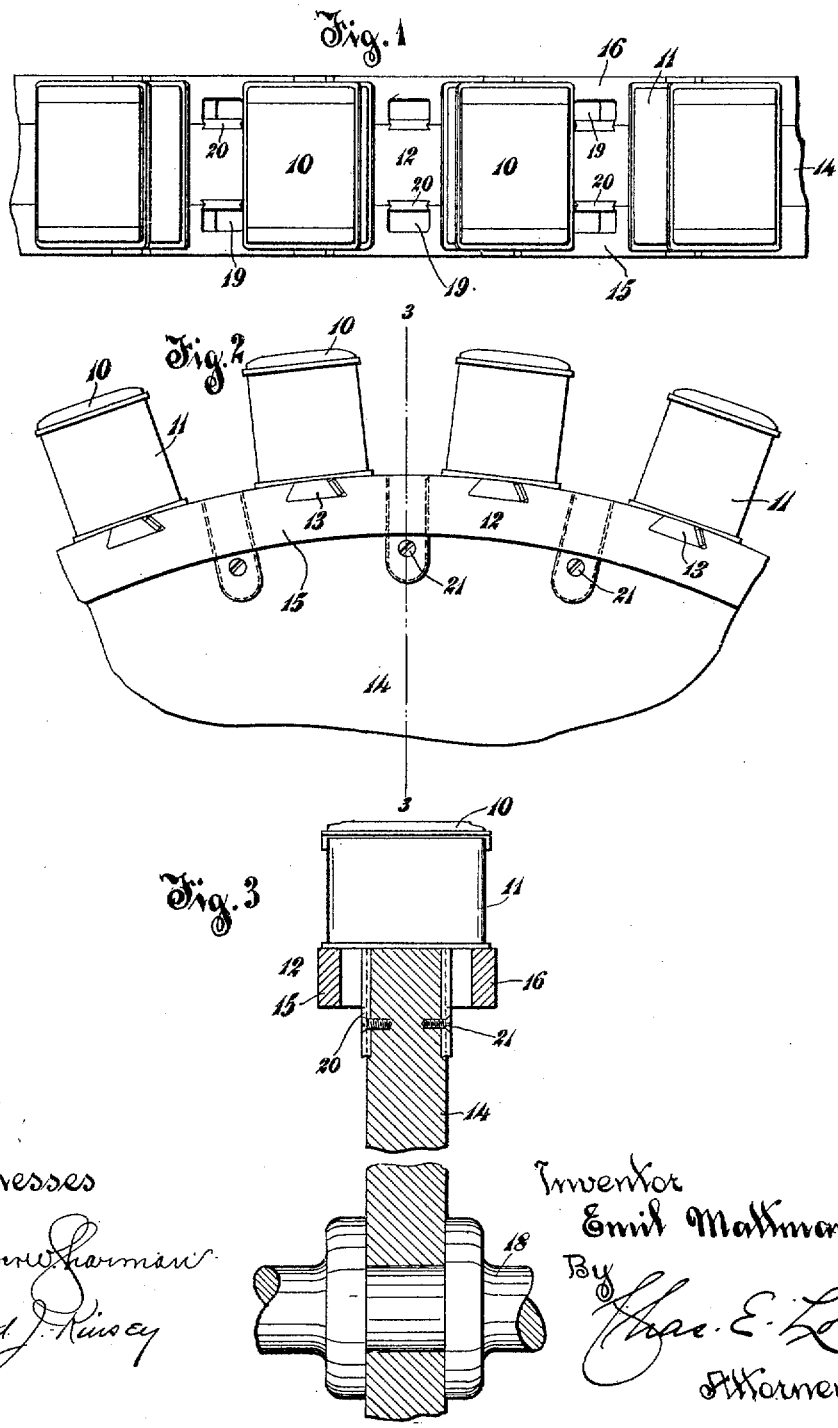

EMIL MATTMAN, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

DYNAMO-ELECTRIC MACHINE.

969,790.  Specification of Letters Patent.  Patented Sept. 13, 1910.

Application filed August 1, 1907. Serial No. 386,654.

*To all whom it may concern:*

Be it known that I, EMIL MATTMAN, a citizen of the Republic of Switzerland, residing at Norwood, in the county of Hamilton and State of Ohio, have invented certain new and useful Improvements in Dynamo-Electric Machines, of which the following is a full, clear, and exact specification.

My invention relates to dynamo-electric machines and especially to the construction of the rotating members thereof.

In operating dynamo-electric machines at high speeds it is found that the stresses developed in the rotating members by centrifugal force are too great for ordinary iron castings to withstand. For this reason such rotating members, or at least their peripheral parts, must be constructed of something stronger than cast iron, nickel steel being especially suitable. Manufacturers of nickel steel forgings, however, charge not for the actual weight of the finished forging but for the weight which the forging would have if all of the space included within its largest dimensions were solid of nickel steel. This makes the expense of large forgings with flanges or other projections very great and some times almost prohibitive.

It is the main object of my present invention to provide means whereby the expense heretofore necessitated by the employment of nickel steel forgings in the rotating members of dynamo-electric machines may be materially reduced. This is accomplished by making all flanges and other projecting parts of pieces separate from the main part of said rotating members, and fastening said flanges or other parts to the main part in any desired manner. If desired said main part may be of other material than nickel steel, the flanges giving sufficient strength. By such arrangements it is possible, when desired, to make the main part of very simple outline, including little or no empty space, while any desired form may be obtained by properly designing and attaching flanges and other projecting parts.

The novel features of my invention will appear from the following description and accompanying drawing and will be particularly pointed out in the claims.

Figure 1 shows a partial edge view of the rotating member of a dynamo-electric machine embodying my invention; Fig. 2 shows a partial end view of said rotating member; and Fig. 3 is a section on the line 3—3 of Fig. 2.

In the arrangement shown, a rotating field member is formed of poles 10 wound with coils 11, the poles being mounted upon the yoke 12 in any usual or desired manner, as by dovetail connections 13. The yoke 12 comprises a main or central portion 14 and two flange portions 15 and 16 not integral therewith. The central portion 14, here shown as a simple disk, may be of one or more parts as desired, and is mounted in any desired manner on the shaft 18. The flange portions 15 and 16 are each provided with radial slots 19. Double dovetail connecting pieces 20 are arranged to fit in the edges of said slots and in preferably shallower slots in the ends of the central portion 14, ventilating spaces being left if desired between the pieces 20 and the bottoms of the slots 19. These members 20, engaging the slots in the portion 14 and in one or the other of the portions 15 or 16, hold the three parts rigidly together, and are themselves held in place by bolts 21 extending into the portion 14. Although the portion 14 is here shown as a simple disk, it may have other forms. Its web part may be thinner than the rim and hub, if desired.

By means of this construction the cost of the rotating member may be greatly diminished, as the main or central portion may have very few and shallow depressions in its surfaces so that it requires very little more material to be paid for than is actually used, while the flange members 15 and 16 are computed merely as curved bars. In addition to this saving in cost in case the parts are all made of nickel steel, there is also a great saving if only the flanges are of nickel steel, the other parts being of cast iron or other desired material. Moreover, there is a saving in labor by the use of my arrangement when forgings of any material are used, as the central portion 14 and the ring-shaped flange portions 15 and 16 are much easier to forge when separate than they would be if all integral. My arrangement is not limited to cases where forgings are used, but is also useful in many other cases.

Many modifications may be made in the precise arrangement here shown and described and all such which do not depart from the spirit and scope of my invention I aim to cover in the following claims.

What I claim as new is:—

1. In a dynamo-electric machine, the combination of a plurality of field poles, a yoke connecting said field poles, said yoke comprising a main portion and a pair of non-integral forged flanges, both main portion and flanges being provided with dovetail slots, and double dovetail connecting pieces each fitting in slots in both the main portion and one of the flanges but filling less than the whole of said slots, whereby ventilating openings are provided.

2. In a dynamo-electric machine, a field yoke of magnetic material comprising a main portion and a non-integral flange portion attached thereto, said flange portion being provided with ventilating openings.

3. In a dynamo-electric machine, a rotatable member comprising a central portion mounted on a shaft, a flange portion on each side of said central portion, said flange portions being provided with radial ventilating openings, and means for attaching said flange portions to said central portions.

4. In a dynamo-electric machine, the combination of a plurality of field poles, with a yoke of magnetic material connecting said field poles, said yoke comprising a main portion and non-integral flanges attached thereto, and being provided with ventilating openings between the poles.

5. In a dynamo-electric machine, a revolving field member comprising a plurality of field poles, and a yoke for said poles, said yoke comprising a main portion mounted on a shaft and flange portions attached to each side thereof, said yoke being provided with ventilating openings between adjacent field poles.

In testimony whereof I affix my signature, in the presence of two witnesses.

EMIL MATTMAN.

Witnesses:
GEO. B. SCHLEY,
OLIVER W. SHARMAN.